TELEVISION RECEIVING SYSTEMS

Filed Nov. 13, 1958 2 Sheets-Sheet 1

INVENTORS
TOMOMI MURAKAMI &
BERNARD V. VONDERSCHMITT
BY W. H. Sprague
ATTORNEY

INVENTORS
TOMOMI MURAKAMI &
BERNARD V. VONDERSCHMITT
BY W. H. Sprague
ATTORNEY

United States Patent Office 2,964,674
Patented Dec. 13, 1960

2,964,674

TELEVISION RECEIVING SYSTEMS

Tomomi Murakami, Haddonfield, and Bernard V. Vonderschmitt, Colwick, N.J., assignors to Radio Corporation of America, a corporation of Delaware Filed Nov. 13, 1958, Ser. No. 773,736
8 Claims. (Cl. 315—27)

This invention relates to television receiving systems and in particular to improved horizontal deflection circuits for use in such systems.

One of the major problems encountered incident to the design of a commercial horizontal deflection circuit for either a monochrome or color television receiver is high frequency oscillations or "ringing" during the trace portion of the deflection cycle. The source of this ringing is the leakage inductance and capacitance of the high voltage transformer of the deflection circuit. Commercial horizontal circuits are fundamentally switching circuits and the leakage inductance and capacitance is resonated to produce voltage and current transients or oscillations. These transients appear on the kinescope raster as light intensity modulation during the trace portion of the deflection cycle and are, for this reason, undesirable. The undesirable effects of the ringing transients on television picture reproduction have long been recognized and various approaches have been used in an effort to minimize these effects. These approaches have not eliminated the ringing at its source. Instead, the typical commercial television receiver includes circuitry which is intended to counteract the effects of ringing on picture reproduction by either cancelling or dissipating the undesired oscillations. As an example, one or more so-called "balancing" capacitors have been connected across the deflection windings. High frequency trap circuits have also been used to dissipate the undesired oscillations. Another approach to the problem is to tightly couple the deflection winding sections by connecting the mid-points of the transformer and the deflection windings. Each of these different approaches shares with the others, since in each the ringing is permitted to start and, once started, is cancelled or dissipated, the fact that extra circuit connections or components are needed to achieve the common result desired. Thus, each approach adds to the cost of the receiver.

It is, accordingly, a principal object of the present invention to provide an improved horizontal deflection circuit for television receiving systems, wherein the development of high frequency oscillations is prohibited without the need of extra circuit connections or components.

The development of high frequency oscillations or ringing in the leakage reactance of television horizontal deflection circuits is prohibited if the teachings of this invention are practiced. The circuit constants of deflection circuits embodying the invention are of a magnitude and so related that the energy in the leakage circuits is reduced to zero, or substantially zero, at the end of the retrace portion of the deflection cycle. By reducing the energy in the leakage circuits to zero at the end of retrace the development of undesired transient oscillations is not possible and ringing during the trace period is eliminated. This result is accomplished, moreover, without the need for extra circuit components or connections.

The invention will be described with reference to the accompanying drawings in which.

Figure 1:
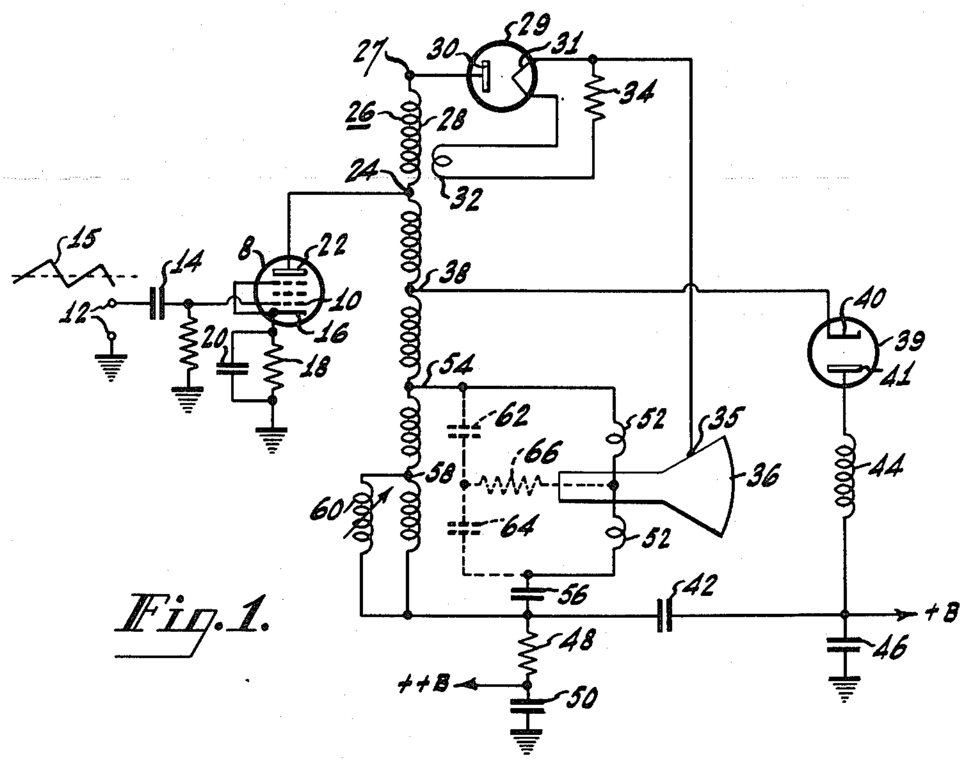
Figure 1 is a schematic circuit diagram of a television horizontal deflection circuit embodying the invention in which the horizontal output amplifier is a vacuum tube.

Referring now to the drawings, and particularly to Figure 1, a typical horizontal deflection circuit to which the teachings of the present invention are applicable includes a horizontal output tube 8, which is illustrated as being of the pentode type. Driving signals 15 of sawtooth waveform are applied to the control grid 10 of the tube from a pair of input terminals 12, one of which is connected to ground and the other of which is connected through a coupling capacitor 14 to the control grid 10. The cathode 16 of the tube 8 is connected to ground through a biasing resistor 18, which is bypassed for signal frequencies by a bypass capacitor 20. The anode 22 of the tube 8 is connected to a terminal 24 of an output transformer 26, which is illustrated as being an autotransformer. The output transformer includes an auxiliary high voltage winding 28, the high voltage terminal 27 of which is connected to the anode 30 of a high voltage rectifier diode 29. Heater voltage for the filament 31 of the high voltage rectifier 29 is provided by an auxiliary winding 32, which is in inductive coupling relation with the high voltage winding 28. One terminal of the auxiliary winding is connected directly with one terminal of the filament 31 and the other terminal of the winding is connected through a voltage dropping resistor 34 to the other terminal of the filament 31. The filament 31 is connected directly with the ultor terminal 35 of a kinescope 36 and supplies high operating voltages thereto.

A tap 38 on the autotransformer 26 is connected to the cathode 40 of a damping diode 39. The lower terminal of the autotransformer 26 is connected through a "B boost" capacitor 42 and an inductor 44 to the anode 41 of the damping diode 39. The inductor 44, which is of relatively small inductance, resonates with its distributed capacitance to minimize damper current harmonics. A capacitor 46 is connected from the junction of the B boost capacitor 42 and the inductor 44 to ground and serves as a radio frequency bypass for the inductor 44. Positive energizing voltages (+B) are supplied to the circuit at the junction of the inductor 44 and the B boost capacitor 42. The B boost voltage developed across the capacitor 42 is taken from the junction of a filter resistor 48 and a filter capacitor 50, which are connected from the lower terminal of the autotransformer 26 to ground.

A horizontal deflection winding 52 for the kinescope 36 is connected from a tap 54 on the autotransformer 26 and through a capacitor 56 to the lower terminal of the autotransformer 26. The capacitor 56 serves to stretch the center of the horizontal raster by partially series resonating the inductance of the deflection winding 52. A variable inductor 60 is connected effectively in shunt with the deflection winding 52 and serves as a width control. It is noted that the portion of the autotransformer between the terminal 24 and the lowermost terminal is often referred to as the "scanning" winding.

In operation, the bias on the horizontal output tube 8 is so adjusted that the driving sawtooth wave 15 produces anode-cathode conduction during a period corresponding to only a little more than half the deflection cycle. During this period, anode-cathode current passes from the positive supply terminal (+B) through the inductor 44 and the damper diode 39 to the autotransformer 26. This current flow induces deflection voltage and current in the autotransformer to provide a substantially linear increase in deflection current through the deflection winding 52. At the beginning of the retrace portion of the deflection cycle, the tube 8 becomes nonconductive and the magnetic field in the autotransformer and deflection winding collapses, causing oscillation of the primary resonant circuit (i.e., the deflection winding 52 and its distributed capacitance) at its self resonant frequency which is normally at least four to five times that of the deflection frequency.

After a half cycle of oscillation, the voltage appearing across the horizontal deflection winding 52 is of such polarity as to cause the damper diode 40 to conduct, thereby damping the energy magnetically stored in the deflection winding. The damping current through the damper diode 39 is in such a direction as to charge the capacitor 42 such that a positive voltage is provided at the junction of the filter resistor 48 and the filter capacitor 50. The current through the diode 39 provides, in accordance with well known reaction scanning principles, the first portion of the sawtooth current through the deflection winding 52. The horizontal output tube 8 is then rendered conductive by the application of a sawtooth signal to its grid and the cycle repeats. The operation of the output tube and the damper tube may be considered to be analogous to a switch.

In accordance with prior art circuitry, a pair of balancing capacitors 62 and 64 would be connected in shunt with the deflection winding 52. The junction of the capacitors 62 and 64 would normally be connected through a resistor 66 to the mid point of the deflection winding 52. The capacitors 62 and 64 serve to reduce the resonant frequency of the yoke circuit to a value whereby the high frequency ringing is not objectionable. The center point connection tends to balance the horizontal winding 52 and reduces the effects of inductive coupling between the vertical and horizontal windings of the deflection yoke. In accordance with the present invention, this network may be eliminated as will be more fully explained. For this reason, this network, including the capacitors 62 and 64 and the resistor 66, has been illustrated in dotted lines.

Figure 2:
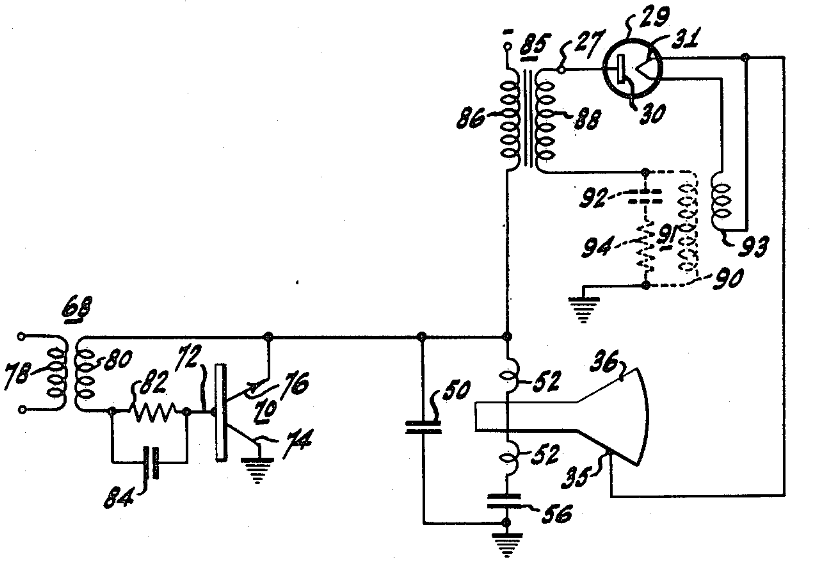
Figure 2 is a schematic circuit diagram of a television horizontal deflection circuit embodying the invention in which the horizontal output amplifier is a transistor.

A typical transistor deflection circuit to which the teachings of the present invention can be applied is illustrated in Figure 2, reference to which is now made. Squarewave voltage pulses, which would normally be derived from a transistor amplifier circuit or the horizontal oscillator circuit, are applied through a transformer 68 to the base electrode 72 of a horizontal deflection output transistor 70. The transistor 70, which may be considered to be of the N–P–N junction type, also includes a collector 74 and an emitter 76. It is, of course, to be understood that a transistor of N type conductivity, such as a P–N–P junction transistor, could also be used in the circuit. The transformer 68 includes a primary winding 78 and a secondary winding 80, one terminal of which is connected through a resistor 82 to the base 72 of the horizontal output transistor 70. The resistor 82 is shunted by a capacitor 84 to form an RC self-bias network. The other terminal of the secondary winding 80 is connected directly with the emitter 76 of the output transistor 70. The collector 74 of the output transistor 70 is connected directly to a point of fixed reference potential such as chassis ground. Thus, a direct low thermal resistance path is provided between the collector or large area electrode of the transistor and the chassis and maximum heat transfer is provided. The transistor 70, it is to be noted, is operated as a common emitter-grounded collector amplifier.

The emitter 76 of the transistor 70 is connected to ground through the horizontal deflection winding 52 and the capacitor 56. The horizontal deflection winding 52 is also shunted by a capacitor 50. The emitter 76 is also connected to one terminal of the primary winding 86 of a high voltage transformer 85. The transformer 85 includes a secondary winding 88, one terminal 27 of which is connected to the anode 30 of the high voltage rectifier 29. A transistor, as contrasted with a vacuum tube, is a low impedance device. Accordingly, the need for autotransformer coupling is eliminated, and the deflection transistor 70 is connected directly with the deflection winding 52. The filament 31 of the high voltage rectifier is connected with the ultor terminal 35 of the kinescope 36 and supplies the high operating voltages thereto. The other terminal of the primary winding 86 of the high voltage transformer is connected to a direct current negative supply source (not shown), which supplied emitter biasing voltages to the transistor 70. The other terminal of the secondary winding 88 of the high voltage transformer is connected to ground through the inductive winding 90 of a parallel resonant trap circuit 91. A series arrangement of a capacitor 92 and a resistor 94 is connected in parallel with the inductor 90. The trap circuit 91, would, in accordance with prior art circuit design, be tuned to the frequency of the undesired ringing transients. The energy in the trap circuit, due to its excitation by the ringing transients, is then used to provide the heater power for the filament of the high voltage rectifier 29. To this end, the energy of the trap circuit could be coupled through an auxiliary winding 93, which is in inductive coupling relation with the inductor 90 of the trap circuit, to the filament 31. Since the need for the harmonic trap circuit 91 is eliminated when the teachings of the present invention are practiced, the trap circuit 91 has been illustrated in dotted lines.

The horizontal output transistor 70 is operated as a bidirectional switch. During the trace portion of the deflection cycle, the transistor 70 is forward biased from the negative supply terminal and the positive portion of the pulses which are applied to the base through the input transformer 68. Hence, current will flow from the collector 74 to the emitter 76 and from the emitter through the deflection winding 52 of the deflection yoke associated with the kinescope 36. The current flow through the deflection winding 52 will increase in a linear manner with time until a pulse of negative polarity is applied to the base 72 of the transistor through the transformer 68. At this time, current in the emitter-collector circuit of the transistor 70 decreases to a low value and the energy stored in the deflection winding 52 discharges through the capacitor 50 in a half-wave oscillatory manner. This period is during the retrace portion of the horizontal deflection cycle. When the input pulse terminates, the forward bias condition is restored on the output transistor 70 and the circuit including the deflection winding 52 and the transistor 70 is closed. The operating cycle then repeats. Thus, the deflection arrangement, including the transistor 70, generates a sawtooth current wave for horizontally deflecting the electron beam of the kinescope 36.

Figure 3:
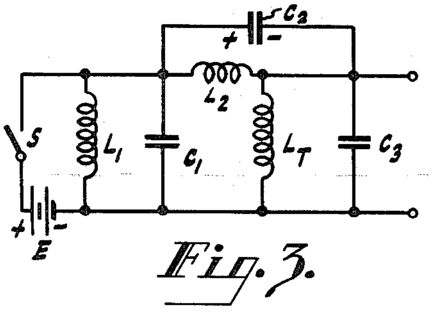
Figures 3 and 4 are equivalent circuit diagrams for the horizontal deflection circuits of Figures 1 and 2.

In Figure 3, reference to which is now made, an equivalent circuit diagram for the deflection circuits of both Figures 1 and 2 includes a battery E which has a voltage rating which corresponds to the equivalent voltage which is applied to the horizontal yoke during the trace period of the horizontal deflection cycle. A switch S is connected in series between the battery E and an inductor $L_1$. The switch S is a schematic representation of the horizontal output tube and damping tube of Figure 1 or of the horizontal output transistor in Figure 2. Stated otherwise, the horizontal tube and damper of Figure 1 or the transistor of Figure 2 have been replaced, for the sake of circuit simplicity and ease of circuit analysis, by the switch S. The switch S is opened (high impedance) during retrace and closed (low impedance) during trace.

The inductor $L_1$ represents the equivalent inductance of the deflection yoke. In the case of the circuit of Figure 1, where an output autotransformer is used, the inductance $L_1$ is, for the sake of circuit simplicity, referred to the high voltage side of the output and high voltage transformer. The inductance of the equivalent inductor $L_1$ may be calculated by the formula:

$$L_1=\left(\frac{N_P}{N_Y}\right)^2 L_Y$$

where $N_P$=total number of turns on the autotransformer 26, that is, the total number of turns between the terminal 27 and the lowermost terminal of the autotransformer 26 in Figure 1; $N_Y$=total number of turns of the yoke winding of the autotransformer 26, that is, the total number of turns between the terminal 54 and the lowermost terminal of the autotransformer 26; and $L_Y$=inductance of the horizontal windings 52. Because of this transformation, the inductance of the inductor $L_1$ in the equivalent circuit for the circuit of Figure 1 is higher than the inductance of the output windings of the yoke for the actual circuit. That is to say, the transformation of the yoke to the high voltage side of the output transformer requires that an inductor of greater inductance be used in the equivalent circuit or in any circuit analysis of the equivalent circuit.

A capacitor $C_1$ is connected in parallel with the inductor $L_1$. This capacitor represents or is the equivalent capacitance of the horizontal yoke and any added external capacitance. In the case of Figure 1, it, like the yoke inductance, has been referred to the high voltage side of the output transformer. The value of the capacitor $C_1$ may be calculated by the formula $$C_1=C_Y/\left(\frac{N_P}{N_Y}\right)^2$$

where $C_Y$=capacitance of the horizontal yoke windings, plus any added external capacitance.

As was noted hereinbefore, the transistor circuit of Figure 2 does not include an autotransformer. The equivalent yoke inductance $L_1$ and equivalent yoke capacitance $C_1$ (Figure 3) for this circuit are also transformed values, however, and may be calculated by the formulae:

$$L_1=\left(\frac{N_2}{N_1}\right)^2 L_Y$$

where $N_1$=turns of the primary winding 86 of the high voltage transformer and $N_2$=turns of the secondary winding 88 of the high voltage transformer; and $$C_1=C_Y/\left(\frac{N_2}{N_1}\right)^2$$

The equivalent circuit of Figure 3 also includes a third parallel branch which includes a capacitor $C_3$. This capacitor represents the equivalent capacitance which appears between the high voltage terminal (i.e., terminal 27—Figures 1 and 2) of the actual deflection circuit and ground. An inductor ($L_2$) is connected between the high voltage terminals of the capacitors $C_1$ and $C_3$. The inductance ($L_2$) of this inductor is representative of the leakage inductance of the high voltage winding to the horizontal deflection winding. Its value may be measured, for example, by shorting out the "scanning" winding in Figure 1 and measuring the inductance between the terminal 27 and ground. An inductor $L_T$ is connected from the junction of the inductor $L_2$ in parallel with the capacitor $C_3$. This inductor $L_T$ represents the open circuit inductance measured at the high voltage terminal 27 and is normally relatively large.

A capacitor $C_2$, which is connected in parallel with the inductor $L_2$, represents the equivalent stray capacitance across the high voltage winding. Normally, this capacitance is very small and may, for all practical considerations, be neglected. It is illustrated for the sake of completeness.

Figure 4:
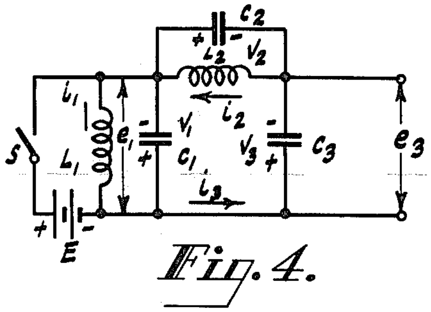

The equivalent circuit diagram of Figure 3 may be simplified as shown by the equivalent circuit diagram of Figure 4. The inductance of the inductor $L_T$ is normally very much greater than the leakage inductance ($L_2$) of the deflection circuit. For this reason, the inductance of the inductor $L_T$ may be neglected for the purposes of circuit analysis. Thus, the inductor $L_T$ has been eliminated from the simplified circuit diagram of Figure 4. The various voltages and currents for the equivalent circuit diagram are also indicated in Figure 4.

Analysis of horizontal deflection circuits has indicated that transient oscillations or "ringing" during the trace portion of the deflection cycle can be eliminated if, by proper design and selection of the circuit components, the energy in the leakage circuit ($C_2$, $L_2$—Figure 4) is reduced to zero or at least substantially zero, at the end of the retrace portion of the deflection cycle. A detailed mathematical analysis of the equivalent circuit of Figure 4 has confirmed the foregoing premise, that is to say transient ringing can, in fact, be eliminated, without the need of extra circuit components such as those shown by dotted lines in Figures 1 and 2, if the circuit parameters are properly selected to reduce the energy in the leakage circuits to zero at the end of the retrace cycle. Moreover, deflection circuits have been built and tested in which, through proper selection of the circuit parameters, ringing is eliminated without the need of separate circuit components or connections. Thus, the present invention is a teaching that undesired transient ringing in a horizontal deflection circuit can be eliminated during trace without the need of special circuitry if, at the end of retrace, by proper selection of circuit parameters, the energy in the leakage circuits is reduced to zero, that is both the current ($i_2$) and voltage ($v_2$) of the leakage circuits is zero at the end of retrace.

It has been determined that the voltage [$et(t)$] across the horizontal yoke windings during the retrace period is equal to:

$$e_1(t)=\frac{v_1}{\beta^2-\lambda^2}\left[\frac{a_2\beta^2-a_0}{\beta}\sin\beta t+(\beta^2-a_1)\cos\beta t\right.$$

$$\left.+\left(\frac{a_0-a_2\lambda^2}{{}^{\circ}\lambda^{\circ}}\right)\sin\lambda t+(a_1-\lambda^2)\cos\lambda t\right]$$

where:

$t$=retrace time $$a_0=\frac{i_1(0)}{L_2(C_1C_2+C_2C_3+C_1C_3)v_1}$$

$$a_1=\frac{C_1v_1+C_3v_1+C_3v_2}{L_2(C_1C_2+C_2C_3+C_1C_3)v_1}$$

$$a_2=\frac{i_1(0)(C_2+C_3)-i_2(0)C_3}{(C_1C_2+C_2C_3+C_1C_3)v_1}$$

$$\beta^2=\frac{(L_1C_1+L_2C_2+L_1C_3+L_2C_3)}{2L_1L_2(C_1C_2+C_2C_3+C_1C_3)}+\frac{\sqrt{(L_1C_1+L_2C_2+L_1C_3+L_2C_3)^2-4L_1L_2(C_1C_2+C_2C_3+C_1C_3)}}{2L_1L_2(C_1C_2+C_2C_3+C_1C_3)}$$

and $$\lambda^2=\frac{(L_1C_1+L_2C_2+L_1C_3+L_2C_3)}{2L_1L_2(C_1C_2+C_2C_3+C_1C_3)}-\frac{\sqrt{(L_1C_1+L_2C_2+L_1C_3+L_2C_3)^2-4L_1L_2(C_1C_2+C_2C_3+C_1C_3)}}{2L_1L_2(C_1C_2+C_2C_3+C_1C_3)}$$

and where the currents $i_1(0)$ and $i_2(0)$ are the currents through the yoke and in the leakage circuit, respectively, at time=zero, which is at the beginning of retrace.

During the retrace period of the deflection cycle, at some time ($t$), the high voltage $e_3(t)$ is equal to:

$$e_3(t)=\frac{v_1+v_2}{\beta^2-\lambda^2}\left[\frac{b_2\beta^2-b_0}{\beta}\sin\beta t+(\beta^2-b_1)\cos\beta t+\left(\frac{b_0-b_2^2}{\lambda}\right)\sin\lambda t+(b_1-\lambda^2)\cos\lambda t\right]$$

where:

$$b_0=\frac{L_1i_1(0)+L_2i_2(0)}{L_1L_2(C_1C_2+C_2C_3+C_1C_3)(v_1+v_2)}$$

$$b_1=\frac{L_1(C_1v_1+C_3v_1+C_3v_2)+L_2(C_2v_2+C_3v_1+C_3v_2)}{L_1L_2(C_1C_2+C_2C_3+C_1C_3)(v_1+v_2)}$$

and $$b_2=\frac{C_2i_1(0)+C_1i_2(0)}{(C_1C_2+C_2C_3+C_1C_3)(v_1+v_2)}$$

By using the equation for $e_1(t)$ above, the values for the various circuit constants can be determined which will satisfy the condition that there will be no transient ringing during the trace part of the deflection cycle. As a general rule the values of the yoke inductance ($L_1$), the yoke voltage ($v_1$), the retrace time ($t_1$), the maximum current through the yoke ($i_1$ max.) will be determined by the deflection requirements. The maximum yoke current may be determined as follows:

$$i_1\ \text{max.}=i_1(0)=\frac{-v_1t_2}{2L_1}$$

where $t_2$=time of trace interval. In addition, the voltage $e_1(t_1)$ at the end of retrace is equal to $v_1$. As noted above, the elimination of the transient ringing is physically due to the reduction of the energy in the deflection leakage circuits to zero at the end of retrace. Thus, the leakage current $i_2(0)$ will equal zero at the end of retrace, as will the leakage voltage ($v_2$). With these determined or known values, a set of constants can be found which will satisfy the foregoing equation for $e_1(t)$, and by using the calculated values for these constants in the deflection circuit the undesired ringing will be eliminated. The equation for $e_3(t)$, above, can be used to confirm the calculated values of the circuit parameters for the condition that $i_2(0)$ and $v_2$ equal zero at the end of the retrace portion of the deflection cycle. From the equivalent circuit of Figure 4 it is seen that $v_2$ equals $e_1$ minus $e_3$. Thus, in order that the no-ringing condition of $v_2$ equals zero at the end of retrace be met, $e_1(t)$ must equal $e_3(t)$ at the end of retrace. By substituting the calculated values of the circuit parameters in the formula for $e_3(t)$ and comparing the value of $e_3(t)$ with the calculated value of $e_1(t)$, the value of $e_1(t)$ can be mathematically checked.

It has been found that it is most convenient to vary either the leakage inductance ($L_2$) or the capacity ($C_3$) across the high voltage terminal in order to satisfy the foregoing equation for $e_1(t)$ and achieve the desired optimum condition of no transient ringing during the trace portion of the deflection cycle. The design for any particular deflection requirement, in which the values of yoke inductance, yoke voltage, retrace time, etc. are initially specified can be simplified by determining the set of constants which will satisfy the equation for $e_1(t)$, and by plotting a graph of the type illustrated in Figure 5.

Figure 5:
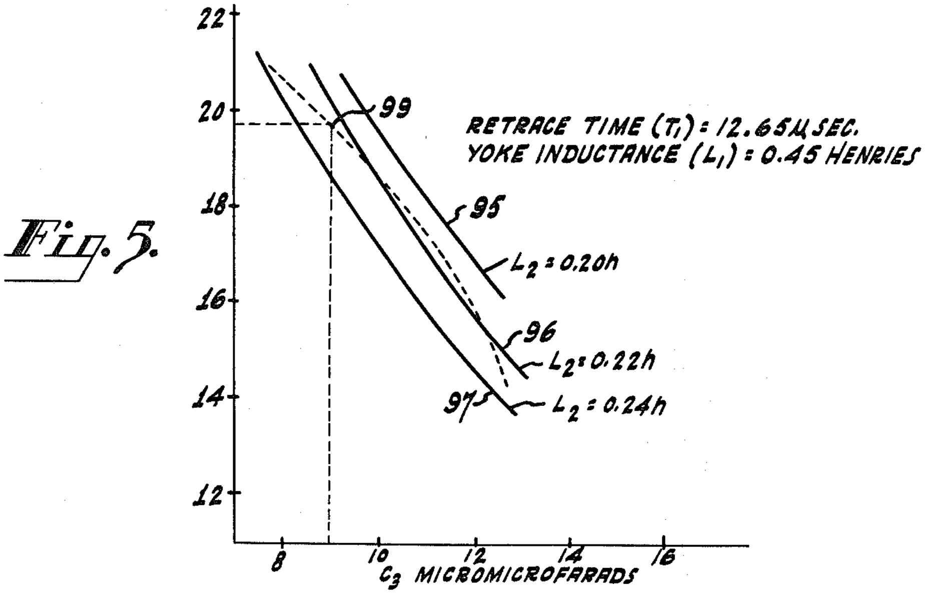
Figure 5 is a graph which relates various circuit constants of the equivalent circuit diagram of Figure 4 selected in accordance with the teachings of the present invention.

The graph of Figure 5 relates the yoke capacitance ($C_1$) to the capacity ($C_3$) at the high voltage terminal. As was mentioned hereinbefore, certain of the constants of the deflection circuit such as the retrace time ($t_1$) and the yoke inductance ($L_1$) will be initially specified. As an example, the curves 95, 96, 97 of the graph of Figure 5 relate the capacitance values of the capacities $C_1$ and $C_3$ for different values of leakage inductance ($L_2$) suitable for use in a deflection circuit in which the retrace time is specified as being 12.65 microseconds and the yoke inductance is 0.45 henry. The dotted curve 98 relates the constants $C_1$ and $C_3$ necessary to satisfy the foregoing equation for $e_1(t)$ for the conditon of no ringing during trace, that is zero energy in the leakage circuit at the end of retrace. By selecting a point on the curve 98, such as the point 99, and noting its intersection with the abscissa of the graph, the value of $C_3$ is determined. As an example, the value of $C_3$ is 9 micromicrofarads at the point 99. The correct value of $C_1$ for the zero ringing condition is determined by noting the intersection of point 99 with the ordinate of the graph. In the example given, the value of $C_1$ is 19.5 microfarads. It is noted that the leakage inductance at the point 99 is 0.23 henry, or half-way between the curves 96 and 97, which represent curves for a leakage inductance of 0.22 and 0.24 henry, respectively, at a retrace time of 12.65 microseconds.

The following circuit parameters, by way of example, have reduced transient ringing to zero in a circuit which has been built and tested. These values correspond to the point 99 on the graph of Figure 5.

$C_1$=19.5 micromicrofarads.
$C_3$=9 micromicrofarads.
$L_2$=0.23 henry.
$C_2$=2 micromicrofarads.

The foregoing circuit parameters were used in a deflection system having the following specifications:

$L_1$=transformed yoke inductance=0.45 henry.
$v_1$ =transformed yoke voltage=2200 volts.
$t_1$ =retrace time=12.65 microseconds.
$t_2$ =trace time=50.95 microseconds.

The leakage inductance ($L_2$) of a deflection circuit may be controlled by varying the coupling between the high voltage winding of the output transformer and the primary or "scanning" winding of the output transformer. The coupling may be varied, for example, by controlling the spacing between the windings in any well known manner as by the use of insulating "spacers." In addition, the number of winding turns per layer can also be varied, which will also vary the coupling and thus the leakage inductance. The leakage inductance is also a function of the number of turns on the high voltage winding, so that by varying the number of turns the leakage inductance can also be varied.

The capacitance ($C_3$) between the high voltage terminal and ground can also be varied in a number of ways. As an example, the capacitance is a function of the spacing between the inside wall of the high voltage cage and the high voltage winding so that the capacitance can be varied by varying this spacing. A separate shield around the high voltage winding may also be used and the capacitance can be varied by varying the spacing between the shield and the winding. This capacitance is also a function of the length of the lead between the high voltage winding and the high voltage rectifier. Accordingly, variation in the length of this lead will also vary the capacitance ($C_3$).

As was explained hereinbefore, it is most convenient to vary either the leakage inductance ($L_2$) or the capacitance ($C_3$) at the high voltage terminal in order to satisfy the condition that the energy in the leakage circuit equal zero at the end of retrace. One reason for this fact is that the parameters $L_2$ and $C_3$ are easily varied by simple physical adjustments, as described above. The second and more important reason is that most of the other deflection parameters such as yoke inductance, retrace time, yoke voltage, etc. are normally, in commercial receiver designs, a function of some other receiver requirements and are not easily varied unless some of these other receiver requirements are also changed. The leakage inductance and high voltage capacitance are not usually dependent on other receiver requirements, however, and may be varied within rather great limits without adversely effecting receiver performance in some other respect. Thus, commercial manufacturing requirements are most easily met by varying the leakage inductance ($L_2$) or high voltage capacitance ($C_3$), or both. While this is the case, there may be instances where one of the other circuit parameters, such as yoke inductance, capacitance, retrace time etc. may be conveniently varied to achieve the zero energy condition at the end of retrace.

Figures 6, 7:
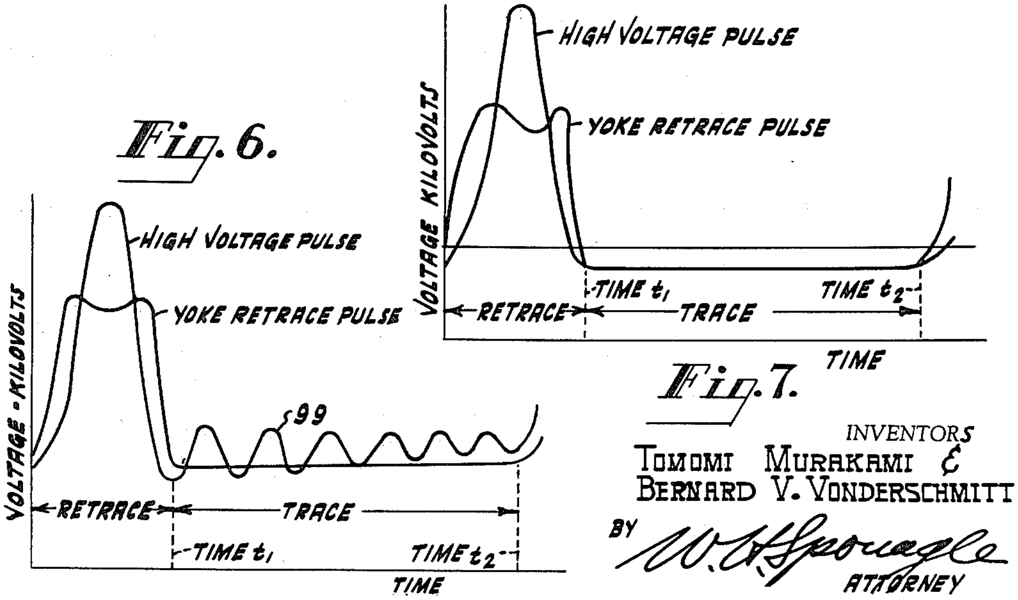
Figure 6 is a graph illustrating certain of the characteristic curves of horizontal deflection circuits of conventional design.
Figure 7 is a graph illustrating certain of the characteristic curves of horizontal deflection circuits constructed in accordance with the teachings of the present invention.

The improved performance of deflection circuits embodying the teachings of the present invention will be evident from a consideration of the curves illustrated in Figures 6 and 7. The curves illustrated in Figure 6 are of a deflection circuit of conventional design. At the end of the retrace portion of the deflection cycle (time $t_1$) the high voltage pulse ($e_3$—Figure 3) and the yoke retrace pulse ($e_1$—Figure 3) are of unequal values and there is current flow ($i_2$) in, and a voltage ($v_2$) across, the leakage circuit. It should be understood that the yoke retrace pulse is referred to the high voltage side of the deflection circuit, that is to say, it is a transformed value and equal to the actual value of the retrace pulse multiplied by the turns ratio of the high voltage transformer. Since the transformed retrace pulse and the high voltage pulse are unequal at the end there is energy in the leakage circuit. This energy resonates to provide high frequency ringing or oscillations as shown by the waveform 100. In conventional circuit designs, these high frequency oscillations are balanced or "bucked" out, such as by the balancing capacitor network of Figure 1, or may be dissipated, such as by the harmonic trap circuit of Figure 2.

In Figure 7, the same waveshapes as those illustrated in Figure 6 are shown for a deflection circuit constructed in accordance with the teachings of the present invention. At the end of retrace (time $t_1$) the high voltage pulse ($e_3$) and yoke retrace pulse ($e_1$), which, again, is the transformed value, are equal in value. Thus, the voltage ($v_2$) across the leakage circuit and current flow ($i_2$) in the leakage circuit is zero at the end of retrace. Stated otherwise, there is no energy in the leakage circuit at the end of the retrace portion of the deflection cycle. Accordingly, a resonant condition, and hence high freqency oscillations or ringing, are prevented. This is shown by the constant voltage condition during the trace portion of the deflection cycle, which is to be contrasted with the oscillatory condition of conventional circuits as shown in Figure 6.

It is evident from a consideration of Figures 6 and 7 that the present invention is an entirely different approach to the high frequency ringing problem encountered during the trace period of all horizontal deflection circuits. The prior art approaches recognize the undesirable effects of the ringing and provide means for either cancelling or dissipating the undesired oscillations by the provision of extra circuitry. The present invention, on the other hand, does not permit high frequency oscillations ever to be developed. In this sense, the present invention approaches the ringing problem by attacking it at the immediate source, namely the leakage circuits, and solves the problem by not permitting the oscillations to start. This is in contrast to the prior art approaches which do not eliminate the oscillations at their source but provide some other means, in the form of extra circuitry, for counteracting them. The immediate advantage of the present invention is that no extra circuitry is needed to accomplish the desired result. In addition, this approach positively assures the elimination of the undesired oscillations by not permitting them to start, rather than trusting other circuitry to eliminate them once they have started.

It has been found that other benefits accrue by the practice of the present invention. As an example, ringing above a certain amplitude has been found to cause the output tube to operate beyond the knee of its plate characteristic. This results in a form of radio frequency interference known as "snivets", which are a type of Barkhausen oscillation. By minimizing and substantially reducing the ringing in the high voltage winding to zero, in accordance with the present invention, the horizontal output amplifier can be operated near its load line without, however, crossing the load line. This permits operation at very high efficiency without the danger of generating the undesired snivets. It is also possible, by minimizing ringing in the high voltage winding, to operate the horizontal output amplifier with maximum driving signals. This permits operation whereby the crossover point of operation between conduction of the driver amplifier and the damper tube can be made without interrupting the yoke current. Since the application of maximum amplitude driving signals to the horizontal output tube is permitted, the efficiency of the deflection circuits is further increased.

The invention described herein eliminates undesired transient oscillations or ringing in the high voltage winding of television horizontal deflection circuits. By eliminating the ringing, the need for the usual circuit networks or components for cancelling the undesired oscillations or counteracting their adverse effect on television reception is eliminated. Accordingly, improved circuit performance at reduced cost result from the practice of this invention.

What is claimed is:

1. In a television receiving system including an image reproducing device, a horizontal deflection and high voltage power supply circuit for said image reproducing device, said circuit having inductive and capacitive leakage reactance and comprising in combination, a horizontal deflection winding having inductive and capacitive reactance, switching means coupled with said deflection winding to provide a substantially linear increase in current flow therethrough during the trace portion of the horizontal deflection cycle of said receiving system, a high voltage winding having inductive reactance and a high voltage terminal, means coupling said high voltage winding with said switching means to provide at said high voltage terminal a high voltage pulse during the retrace portion of the deflection cycle, said circuit having a capacitive reactance between said high voltage terminal and a point of reference potential in said circuit, means connecting said high voltage terminal with said image reproducing device for applying a high operating voltage thereto, and means consisting of the inductive and capacitive leakage reactance of said deflection and power supply circuit, the inductive and capacitive reactance of said deflection winding, the inductive reactance of said high voltage winding and the capacitive reactance between said high voltage terminal and said point of reference potential for providing voltage relationships at the end of the retrace portion of the deflection cycle of said receiving system substantially in accordance with:

$$v=e_1-e_2=0$$

where $v$ =voltage across said leakage reactance, $e_1$=voltage across said deflection winding transformed to said high voltage terminal, $e_2$=voltage across said high voltage winding, whereby high frequency oscillation is minimized during the trace portion of the deflection cycle.

2. In a television receiving system, a horizontal deflection and high voltage power supply circuit having leakage reactance and of the type which is normally subject to high frequency oscillation during the trace portion of the deflection cycle of said receiving system, and means for reducing the energy content of said leakage reactance to substantially zero at the end of the retrace portion of the horizontal deflection cycle of said receiving system thereby to substantially eliminate said high frequency oscillation during the trace portion of the deflection cycle, said means consisting of components of said deflection and power supply circuit having circuit constants of a predetermined magnitude.

3. In a television receiving system including an image reproducing device, a horizontal deflection and high voltage power supply circuit for said image reproducing device, said deflection and power supply circuit having inductive and capacitive leakage reactance and comprising, in combination, a horizontal deflection winding having inductive and capacitive reactance, switching means coupled with said deflection winding to provide a substantially linear increase in current flow therethrough during the trace portion of the horizontal deflection cycle of said receiving system, high voltage transformer means having inductive reactance and coupled with said switching means to provide a high voltage pulse during the retrace portion of the deflection cycle, and means connecting a high voltage terminal of said transformer means with said image reproducing device for applying a high operating voltage thereto, said circuit having a given capacitive reactance between said terminal and a point of reference potential in said circuit, means for reducing the energy content of said inductive and capacitive leakage reactance to substantially zero at the end of the retrace portion of the deflection cycle to substantially eliminate undesired high frequency ringing during the trace portion of the deflection cycle, said energy reducing means consisting of the reactance of the inductive and capacitive leakage reactance of said deflection and power supply circuit, the inductive and capacitive reactance of said deflection winding, the inductive reactance of said transformer means and sa'd given capacitive reactance, all of said reactances being of a predetermined magnitude.

4. In a television receiver, a horizontal deflection and high voltage power supply circuit having inductance, capacitance and inductive and capacitive leakage reactance and including a horizontal deflection winding, switch means in said horizontal deflection circuit providing increased deflection current flow through said deflection winding during the trace portion of the deflection cycle of said receiver and a high voltage pulse during the retrace portion of the deflection cycle, and means for reducing the energy content of said leakage reactance to substantially zero at the end of the retrace portion of the deflection cycle of said receiver thereby preventing high frequency ringing in said horizontal deflection and high voltage power supply circuit during the trace portion of the deflection cycle, said reducing means consisting of said inductance, capacitance, inductive and capacitive leakage reactance, each being of predetermined magnitude.

5. In a television receiver, a horizontal deflection and high voltage power supply circuit having predetermined inductive and capacitive leakage reactance and including a horizontal deflection winding and an output transformer, switch means coupled with said deflection winding and said output transformer to provide increased deflection current flow through said deflection winding during the trace portion of the deflection cycle of said receiver and voltage pulses of predetermined magnitude across said deflection winding and said output transformer during the retrace portion of the deflection cycle, and means for providing a transformed voltage across said deflection winding and a voltage across said transformer of substantially equal magnitude at the end of the retrace portion of the deflection cycle of said receiver thereby preventing high frequency ringing in said horizontal deflection and high voltage power supply circuit during the trace portion of the deflection cycle, said voltage providing means consisting of said inductive and capacitive leakage reactance and the reactance of said deflection winding and transformer, each being of predetermined magnitude.

6. A horizontal deflection and high voltage power supply circuit for the image reproducing device of a television receiver, said circuit including a horizontal deflection winding, switching means coupled with said deflection winding to provide a substantially linear increase in current flow therethrough during the trace portion of the horizontal deflection cycle of said receiving system and a retrace voltage pulse thereacross during the retrace portion of the deflection cycle, high voltage transformer means coupled with said switching means to provide a high voltage pulse during the retrace portion of the deflection cycle, means connecting the high voltage terminal of said transformer means with said image reproducing device for applying a high operating voltage thereto, said deflection and power supply circuit having predetermined values of circuit constants including at least:

(1) The inductance of said deflection winding, (2) The inductance of said transformer, (3) The time duration of said trace portion, and (4) The time duration of said retrace portion, and means for effectively equalizing the amplitude of said high voltage pulse and the transformed value of said retrace voltage pulse at the end of said retrace period to prevent high frequency ringing during said trace portion, said equalizing means including circuit constants the values of which are selected relative to said first mentioned constants, said latter circuit constants consisting of:

(1) The leakage reactance of said deflection and power supply circuit, and (2) The capacitance appearing between said high voltage terminal and a point of reference potential in said circuit.

7. A horizontal deflection and high voltage power supply circuit for a television receiver, said circuit having leakage reactance and including a horizontal deflection winding, and a high voltage winding, and means for providing voltage relationships at the end of the retrace portion of the deflection cycle of said receiver substantially in accordance with:

$$v=e_1-e_2=0$$

where:

$V$=voltage across said leakage reactance,
$e_1$=voltage across said deflection winding transformed to the high voltage side of said high voltage winding,
$e_2$=voltage across said high voltage winding, whereby high frequency oscillation is minimized during the trace portion of the deflection cycle.

8. A horizontal deflection and high voltage power supply circuit of a television receiver having a leakage reactance comprising a horizontal yoke winding having an inductance and a capacitance, means for applying a high voltage relative to ground to one end of said winding, said means including a high voltage terminal and having an open circuit inductance measurable at said terminal, and means for reducing the energy present in said leakage reactance to substantially zero at the end of the horizontal retrace interval, said energy reducing means consisting of a capacitance between said high voltage terminal and ground and a leakage inductance between said high voltage terminal and said yoke winding; said yoke inductance, yoke capacitance and open circuit inductance having predetermined values, and said capacitance and said leakage inductance included in said energy reducing means being adjusted in accordance with said predetermined values so that high frequency oscillations are effectively eliminated during the deflection trace period.

References Cited in the file of this patent

UNITED STATES PATENTS

| | | |
|---|---|---|
| 2,790,108 | Bigelow | Apr. 23, 1957 |
| 2,822,503 | Campbell | Feb. 4, 1958 |
| 2,869,029 | Dietch | Jan. 13, 1959 |